(12) United States Patent
Eriksen et al.

(10) Patent No.: US 7,240,561 B2
(45) Date of Patent: Jul. 10, 2007

(54) PROCESS ADAPTER

(75) Inventors: Christopher L. Eriksen, St. Paul, MN (US); Fred C. Sittler, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/238,384

(22) Filed: Sep. 29, 2005

(65) Prior Publication Data

US 2006/0065058 A1 Mar. 30, 2006

Related U.S. Application Data

(60) Provisional application No. 60/614,091, filed on Sep. 29, 2004.

(51) Int. Cl.
*G01L 7/00* (2006.01)
(52) U.S. Cl. .................................. 73/756; 439/736
(58) Field of Classification Search .................. 73/700, 73/706, 718, 724, 756, 716; 439/736
See application file for complete search history.

(56) References Cited

U.S. PATENT DOCUMENTS

| 5,447,071 A | 9/1995 | Hanson | 73/704 |
|---|---|---|---|
| 5,637,802 A | 6/1997 | Frick et al. | 73/724 |
| 5,811,685 A | 9/1998 | Grudzien, Jr. | 73/724 |
| 6,032,538 A | 3/2000 | Rickman et al. | 73/756 |
| 6,311,561 B1 | 11/2001 | Bang et al. | 73/708 |
| 6,484,585 B1 | 11/2002 | Sittler et al. | 73/718 |
| 6,520,020 B1 * | 2/2003 | Lutz et al. | 73/706 |
| 2003/0209080 A1 | 11/2003 | Sittler et al. | 73/756 |

FOREIGN PATENT DOCUMENTS

| DE | 44 42 478 | 6/1995 |
|---|---|---|
| DE | 102 27 479 | 1/2004 |
| DE | 102 43 079 | 3/2004 |
| EP | 0 251 592 | 1/1988 |
| EP | 0 905 496 | 3/1999 |
| EP | 1 267 152 | 12/2002 |
| WO | WO 2004/105091 | 12/2004 |

* cited by examiner

*Primary Examiner*—Andre J. Allen
(74) *Attorney, Agent, or Firm*—Westman, Champlin & Kelly, P.A.

(57) ABSTRACT

A pressure transducer for clean environments is disclosed. The pressure transducer includes a process coupler, a sensor module, a shield and electronics. The process coupler is configured to couple to a source of process media at a process inlet. The sensor module is coupled to the process coupler and has a pressure sensor therein. The pressure sensor has an electrical characteristic that varies in response to pressure within the sensor module. The shield is disposed adjacent to the process coupler and configured to obstruct substantially all lines of sight between the process inlet and the pressure sensor. Electronics within the transducer are coupled to the pressure sensor to measure the electrical characteristic and provide an indication thereof. A method of sensing a pressure in a clean environment is also provided.

22 Claims, 4 Drawing Sheets

PROCESS ADAPTER

CROSS-REFERENCE TO RELATED APPLICATION

The present application is based on and claims the benefit of U.S. provisional patent application Ser. No. 60/614,091, filed Sep. 29, 2004, the content of which is hereby incorporated by reference in its entirety.

BACKGROUND OF THE INVENTION

Pressure/vacuum transducers are known. Such devices typically couple to a source of pressure or vacuum; generate an electrical characteristic that varies according to the pressure or vacuum; and provide an electrical representation of the varied electrical characteristic such that the vacuum or pressure can be known to an operator, or other parts of the process.

High purity pressure or vacuum transducers are a relatively small subset of general vacuum or pressure transducers. These devices are specifically adapted for exposure to extremely delicate and/or very clean processes. These are the types of processes where a particle breaking from the pressure transducer or even-outgassing therefrom could have a deleterious effect on an entire processing line. One example of such an application is semiconductor processing.

Vacuum transducers are used for high purity applications involving, for example, the deposition or removal (etching) of materials, such as in the semiconductor industry. One concern when operating vacuum transducers in semiconductor deposition chambers is the accumulation of deposition material on the pressure sensor itself. In such applications, it has generally been known to employ a "plasma shield" to limit deposition onto the sensor. This has typically been accomplished by using a perforated piece of sheet metal, which is then spot welded to the housing in front of the sensor. This type of shield has several undesirable side effects. First, due to the thin cross-section of material, thermal conduction of the shield is poor. This poor thermal conduction can decrease the efficiency of heating systems that attempt to maintain the sensor and shield at elevated temperatures in order to reduce the accumulation of deposition material. Accordingly, the poor thermal conductivity of the shield may lead to premature deposited process material on the shield. Another undesirable side effect is that the shield will typically have many narrow, deep crevices at its attachment point to the sidewalls. These trapped volumes lengthen the "pump-down" times and present cleaning difficulties. Yet another undesirable side effect is that the typical sheet-metal shield is often very thin offering limited physical protection for the sensor. Due to its relatively poor physical robustness, the shield can sometimes break or generate particles that are undesirable in the extremely clean environments with which the sensors are employed.

SUMMARY OF THE INVENTION

A pressure transducer for clean environments is disclosed. The pressure transducer includes a process coupler, a sensor module, a shield and electronics. The process coupler is configured to couple to a source of process media at a process inlet. The sensor module is coupled to the process coupler and has a pressure sensor therein. The pressure sensor has an electrical characteristic that varies in response to pressure within the sensor module. The shield is disposed adjacent to the process coupler and configured to obstruct substantially all lines of sight between the process inlet and the pressure sensor. Electronics within the transducer are coupled to the pressure sensor to measure the electrical characteristic and provide an indication thereof. A method of sensing a pressure in a clean environment is also provided.

DETAILED DESCRIPTION OF ILLUSTRATIVE EMBODIMENTS

Various embodiments of the present invention will be described below. In some embodiments, substantially all lines of sight between a process inlet and a pressure sensor are blocked by a shield. In other embodiments, the shield is coupled to a process coupler in a manner that provides high thermal conductivity between the shield and the process coupler. The shield can be formed integral with the process coupler to minimize any internal volumes between the shield and the process coupler thereby reducing pump-down times.

Figure 1:
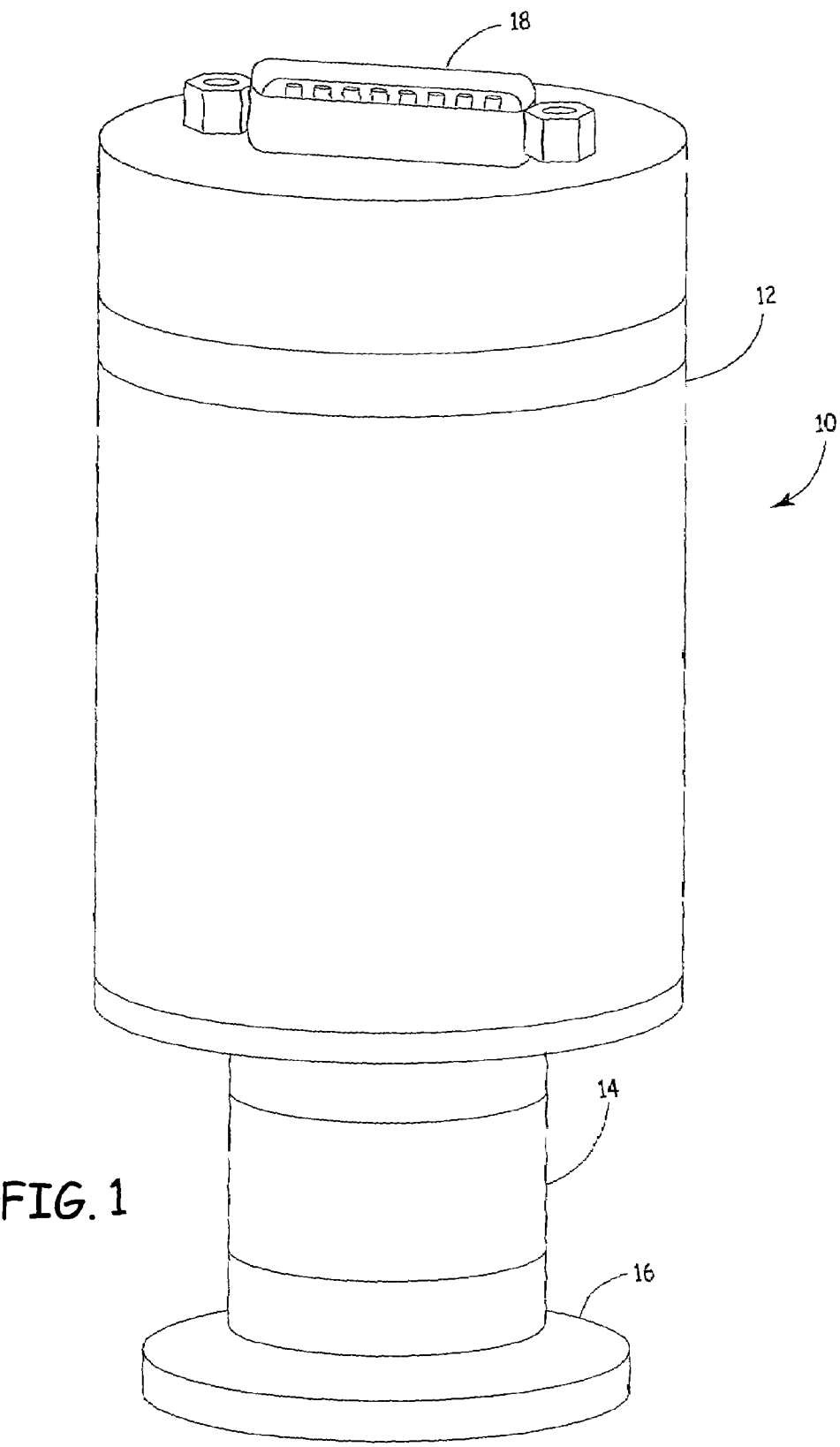
FIG. 1 is a diagrammatic view of a high purity vacuum transducer with which embodiments of the present invention are particularly useful.

FIG. 1 is a diagrammatic view of a high purity vacuum transducer with which embodiments of the present invention are particularly useful. Transducer 10 generally includes sensor electronics enclosure 12, sensor portion 14, process coupling 16, and electrical connector 18. Process coupling 16 is generally coupled to a source of vacuum, or pressure in a high purity environment and fluidly couples the source to sensor portion 14. A pressure sensor within module 14 has an electrical characteristic that varies with the pressure. Examples of such a pressure sensor include, without limitation, deflectable diaphragm capacitance based sensors and deflectable diaphragm strain-based sensors.

Figure 2:
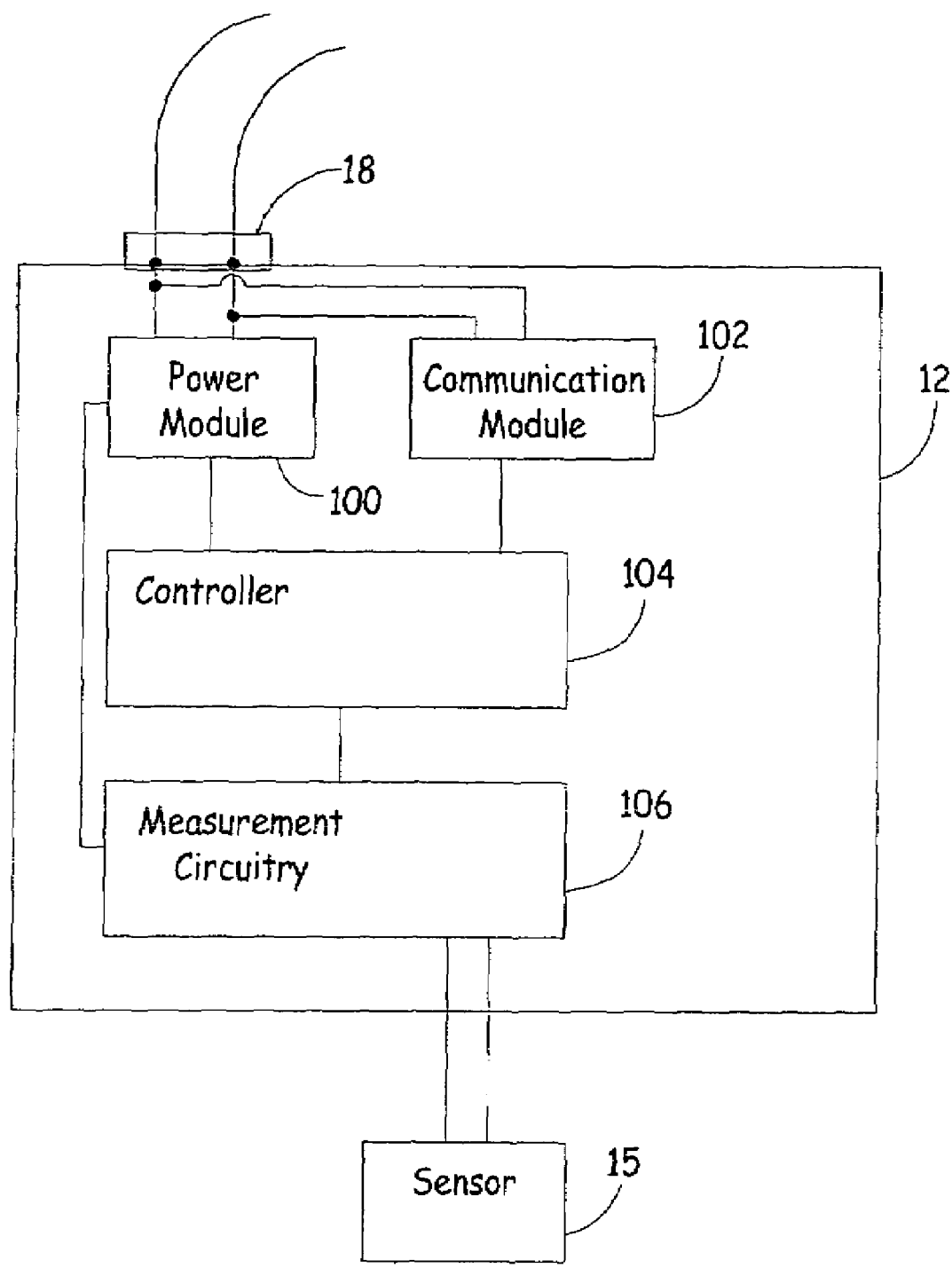
FIG. 2 is a diagrammatic view of electronics within a sensor electronics enclosure.

FIG. 2 is a diagrammatic view of electronics within sensor electronics enclosure 12 electrically coupled to sensor 15 within portion 14. As illustrated in FIG. 2, transducer 10 preferable includes power module 100 that is coupled to connector 18 and is configured to provide, or otherwise condition, electrical power for other components of transducer from electricity received through connector 18. As such, transducer 10 can be completely powered by virtue of electricity supplied via connector 18. Transducer 10 also preferably includes communication module 102. Communication module 102 is configured to allow transducer 10 to communicate via signaling in accordance with a suitable process industry standard protocol. Examples of such protocols include, but are not limited to, the Highway Addressable Remote Transducer (HART) protocol; and the FOUNDATION™ Fieldbus protocol. Additional electronics within enclosure 12 may perform additional functions such as converting the electrical signal to a digital representation, as well as linearizing and/or characterizing the digital output. Controller 104 is coupled to power module 100 and derives power therefrom. Controller 104 is also coupled to communication module 102, such that information supplied by controller 104 can be communicated via module 102. Further, information received by a process loop by module 102 can be provided to controller 104. Controller 104 can be include suitable digital processing circuitry, but is preferably a microprocessor. Controller 104 is coupled to sensor 15 through measurement circuitry 106. Circuitry 106 can include an analog-to-digital converter, such as a Sigma-Delta converter. Circuitry 106 can also include suitable linearization, calibration, and/or characterization circuitry as desired.

Sensor 15 is deflectable, or otherwise deformable in response to an applied pressure or vacuum. Sensor 15 has an electrical characteristic, such as resistance, voltage, or capacitance that varies in response to the applied pressure or vacuum. Preferably, sensors 15 is constructed from semiconductor-based materials. These types of sensors are taught in U.S. Pat. No. 5,637,802, assigned to the Assignee of the present invention. Such semiconductor based sensors generally provide a capacitance that varies with deflection of a portion of the semiconductor sensor. The deflection is in response to an applied pressure. The use of semiconductors, and in particular, single-crystal semiconductors, such as sapphire, provides a number of advantages. Sapphire is an example of a single-crystal material that when properly fusion-bonded has no material interface between the two bonded portions. Thus, the resulting structure is exceptionally robust. Additionally, semiconductor based sensors have very good hysteresis and have an extremely high frequency response. Additional information related to semiconductor based pressure sensors can be found in U.S. Pat. Nos. 6,079,276; 6,082,199; 6,089,907; 6,484,585; and 6,520,020, all of which are assigned to the assignee of the present invention.

The use of a sapphire-based sensor may be particularly beneficial for some embodiments of the present invention. Sapphire is very corrosion resistant, and is suitable for direct exposure to the process medium. Additionally, the sapphire pressure sensor has a fast response time, typically above 100 kHz. By directly placing the sensor 15 in contact with the process medium, there is no isolation fluid, such as silicone oil, that can delay the sensor response and/or dampen system effectiveness. Further, since no isolation fluid is used, there is no chance that a seal could fail and leak isolation fluid into the clean environment.

Figure 3:
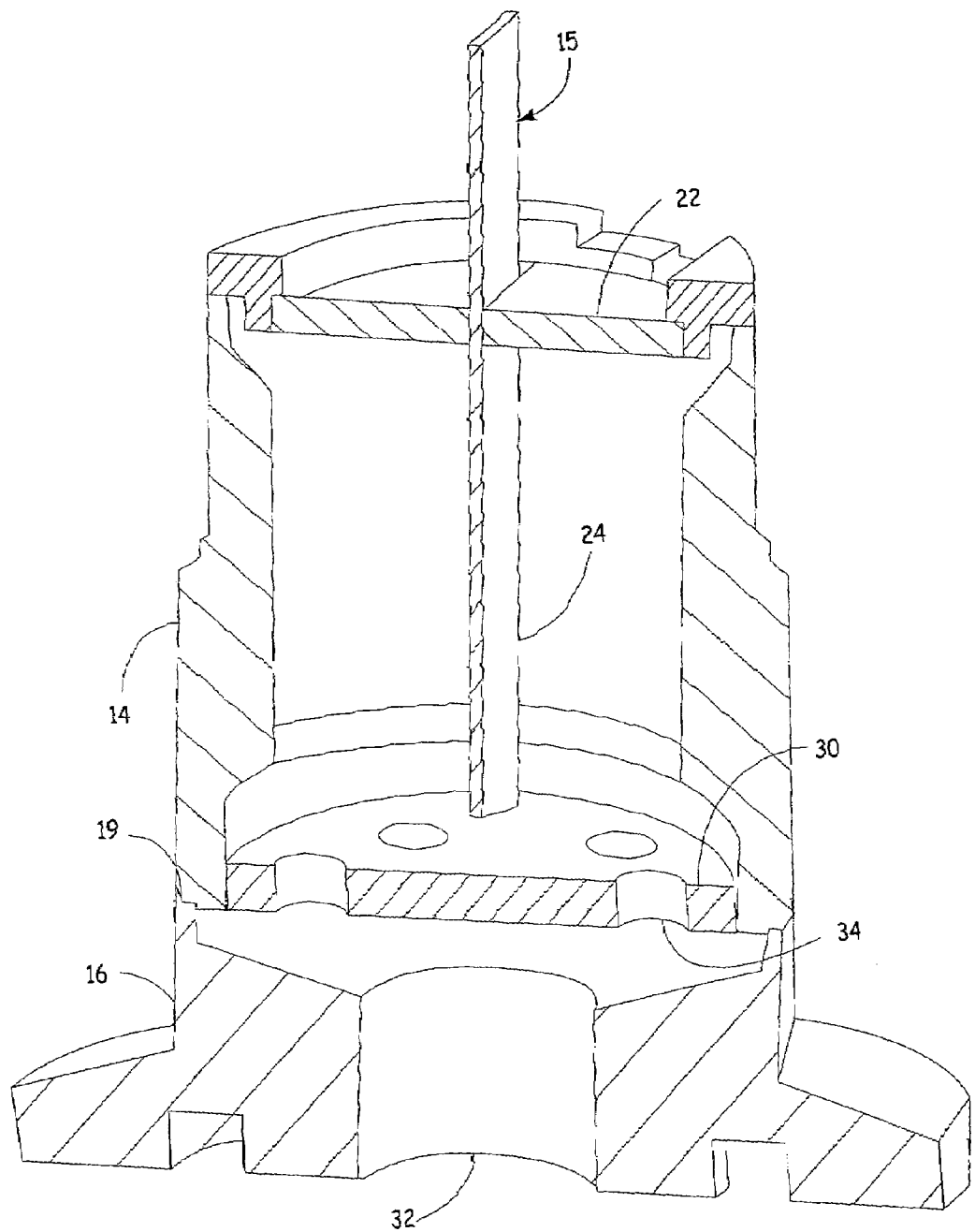
FIG. 3 illustrates a sensor module and process coupling in accordance with an embodiment of the present invention.

FIG. 3 illustrates a sensor module and process coupling in accordance with an embodiment of the present invention. Sensor module 14 couples to process coupler 16 at interface 19. Various other forms of process couplers can be used in accordance with aspects of the present invention. For example, a VCR fitting can be used. As illustrated in FIG. 3, pressure sensor 15 is mounted to sensor portion 14 via mount 22. A pressure-sensing portion 24 of sensor 15 is disposed within module 14. Pressure sensor 15 is preferably constructed in accordance with semiconductor processing techniques using semiconductor materials as described above. Changes in pressure within sensor module 14 generate a deflection on portion 24 that changes an electrical characteristic, such as capacitance, of pressure sensor 15. Electrical conductors coupled to sensor 15 (not shown) convey electrical signals to measurement circuitry 106 allowing circuitry 106 within enclosure 12 to measure the electrical characteristic and thus pressure. Sensor module 14 preferably includes a shield 30 disposed adjacent to process coupler 16. Shield 30 acts to obstruct all lines of sight between a process inlet, such as inlet 32, and pressure sensor portion 24. As used herein, a line of sight is any straight line between two objects, such as between the process inlet and pressure sensor portion 24. Shield 30 can be constructed from any suitable material. One example of a suitable construction is shield 30 being ⅛ inch thick stainless steel.

The obstruction of lines of sight is important to ensure that process material is not undesirably deposited upon sensor portion 24. Although shield 30 obstructs lines of sight between inlet 32 and sensor portion 34, it is also important that shield 30 allow fluidic communication between inlet 32 and sensor portion 24. Accordingly, shield 30 includes a number of apertures 34 that allow the process media received at inlet 32 to have access to sensor portion 24.

Shield 30 is preferably constructed to be an integral part of sensor module 14. Shield 30 can be manufactured separately from other portions of module 14 and then completely welded to module 14. One way shield 30 can be completely welded is by using a single continuous weld that encompasses the entire periphery of shield 30. Preferably, however, shield 14 is formed integrally with module 14. The integral nature of shield 30 within module 14 ensures that the connection between shield 30 and module 14 extremely robust, while also minimizing internal volumes since there is no interface between shield 30 and module 14.

Figure 4:
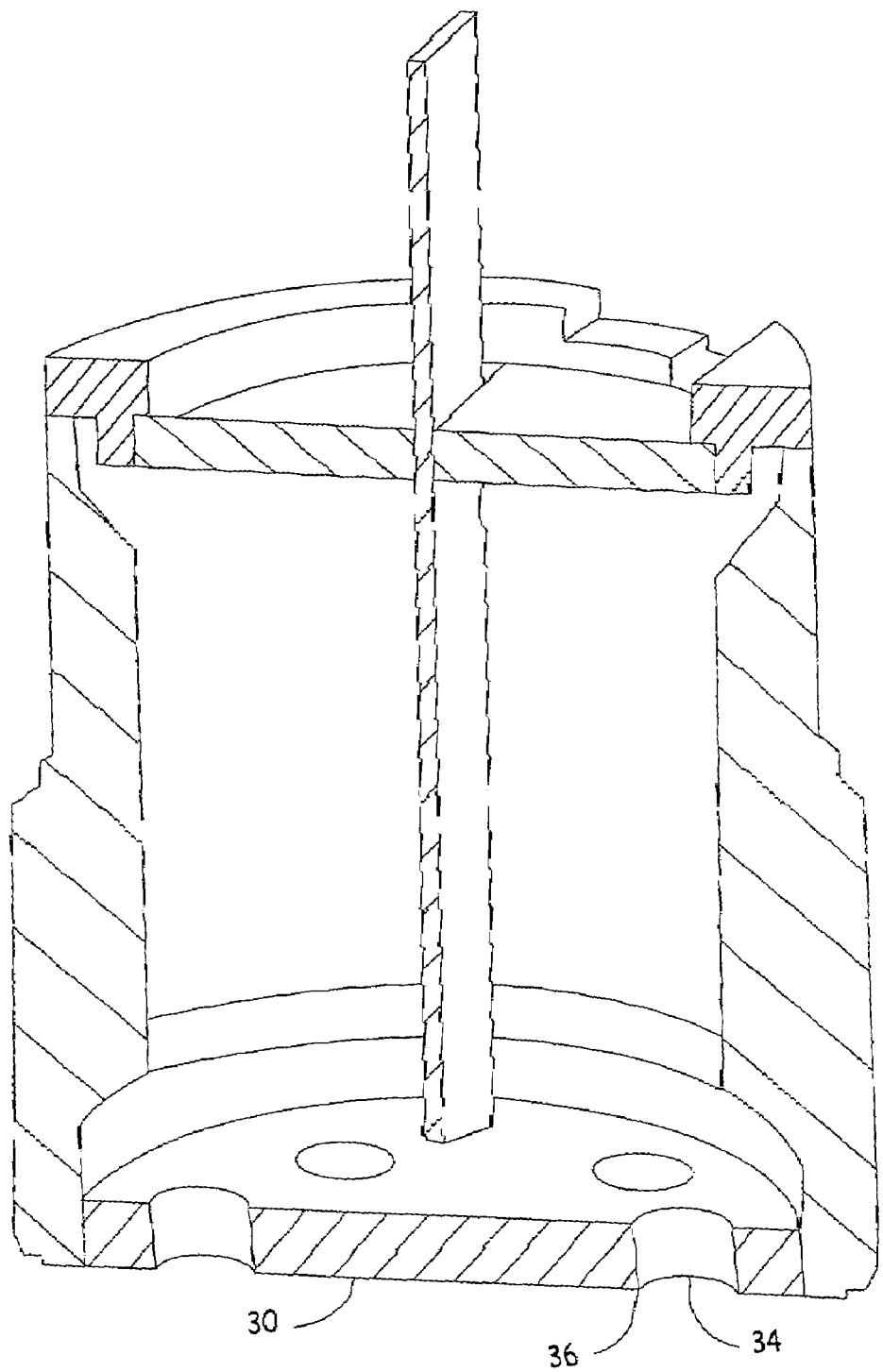
FIG. 4 is a larger perspective view of module 14 in accordance with embodiments of the present invention.

FIG. 4 is a larger perspective view of module 14 in accordance with embodiments of the present invention. Module 14 is illustrated in FIG. 4 as a cross section. In the embodiment illustrated in FIG. 4, shield 30 includes a total of six apertures 34. As will be apparent by viewing FIGS. 3 and 4, the location and size of apertures 34 in shield 30 are preferably chosen such that all lines of sight from inlet 32 are obstructed. Accordingly, each inner tangent 36 and aperture 34 is disposed beyond the radius of inlet 32. Other methods of locating and sizing apertures 34 can be used in accordance with aspects of the present invention. For example, the ratio and location of aperture sizes of apertures 34 could be used to dampen turbulent flow where the process fluid is a gas stream. Additionally, the dimensions and locations of apertures 34 can be varied to selectively filter different particle sizes.

The relatively large thermal conduction pathway between shield 30 and the rest of module 14 ensures that shield 30 will be more effectively heated by heat from the sidewalls of module 14. This will help ensure that shield 30 does not accumulate process material.

Although the present invention has been described with reference to preferred embodiments, workers skilled in the art will recognize that changes may be made in form and detail without departing from the spirit and scope of the invention.

What is claimed is:

1. A pressure transducer for clean environments, the transducer comprising:
   a process coupler configured to couple to a source of process media at a process inlet;
   a sensor module coupled to the process coupler, the sensor module having a pressure sensor therein, wherein the pressure sensor has an electrical characteristic that varies in response to pressure within the sensor module;
   a shield disposed adjacent to the process coupler and configured to obstruct substantially all lines of sight between the process inlet and the pressure sensor; and
   electronics coupled to the pressure sensor to measure the electrical characteristic and provide an indication thereof.

2. The pressure transducer of claim 1, wherein the shield is formed integrally with the sensor module.

3. The pressure transducer of claim 1, wherein the shield is welded to the sensor module in a single continuous weld.

4. The pressure transducer of claim 1, wherein the shield is formed of a metal.

5. The pressure transducer of claim 4, wherein the metal is stainless steel.

6. The pressure transducer of claim 4, wherein the shield has a thickness of approximately 0.125 inches.

7. The pressure transducer of claim 1, wherein the pressure sensor is formed of a semi-conductor based material.

8. The pressure transducer of claim 7, wherein the pressure sensor is formed of s single-crystal material.

9. The pressure transducer of claim 8, wherein the pressure sensor is formed of sapphire.

10. The pressure sensor of claim 1, wherein the electronics further comprise a connector coupled to a power module, wherein the power module is configured to power the transducer with electricity received through the connector.

11. The pressure transducer of claim 1, wherein the electronics further comprise a communication module configured to provide an indication of pressure in accordance with a process industry standard communication protocol.

12. The pressure transducer of claim 1, wherein the electronics further comprise an analog-to-digital convert operably coupled to the pressure sensor to provide a digital indication of the electrical characteristic.

13. The pressure transducer of claim 1, wherein the shield is thermally coupled to the sensor module about the complete periphery of the shield.

14. The pressure sensor of claim 1, wherein the process coupler is a VCR fitting.

15. The pressure sensor of claim 1, wherein the shield includes a plurality of apertures, each aperture having an inner tangent.

16. The pressure sensor of claim 15, wherein apertures are sized and positioned such that each inner tangent is disposed beyond a radius of the process inlet.

17. A method of sensing a pressure in a clean environment, the method comprising:
 fluidically coupling a process pressure of the clean environment directly to a pressure sensor;
 obstructing substantially all lines of sight to the pressure sensor;
 measuring an electrical characteristic of the pressure sensor; and
 providing an output based on the measured characteristic.

18. The method of claim 17, wherein obstructing substantially all lines of sight to the pressure sensor is done with a shield.

19. The method of claim 17, and further comprising providing a thermal conduction pathway from all points about a periphery of the shield.

20. The method of claim 19, wherein providing a thermal conduction pathway is done by welding the periphery of the shield to a sensor module in a single, continuous weld.

21. The method of claim 17, wherein the shield is formed integrally with a sensor module containing the pressure sensor.

22. The method of claim 17, wherein the pressure sensor is formed of semiconductor-based materials.

* * * * *